US012560183B2

(12) United States Patent
Liu et al.

(10) Patent No.: US 12,560,183 B2
(45) Date of Patent: Feb. 24, 2026

(54) FLOATING CONTROL SYSTEM FOR FIXED DISPLACEMENT PUMP SYSTEM

(71) Applicant: HUNAN SINOBOOM INTELLIGENT EQUIPMENT CO., LTD., Changsha (CN)

(72) Inventors: Guoliang Liu, Changsha (CN); Changhui Du, Changsha (CN); Yuxiao Zhang, Changsha (CN); Junbo Zhao, Changsha (CN)

(73) Assignee: HUNAN SINOBOOM INTELLIGENT EQUIPMENT CO., LTD., Changsha (CN)

( * ) Notice: Subject to any disclaimer, the term of this patent is extended or adjusted under 35 U.S.C. 154(b) by 174 days.

(21) Appl. No.: 18/696,830

(22) PCT Filed: Dec. 29, 2022

(86) PCT No.: PCT/CN2022/143606
§ 371 (c)(1),
(2) Date: Mar. 28, 2024

(87) PCT Pub. No.: WO2024/130782
PCT Pub. Date: Jun. 27, 2024

(65) Prior Publication Data

US 2025/0035133 A1 Jan. 30, 2025

(30) Foreign Application Priority Data

Dec. 19, 2022 (CN) ......................... 202211653209.9

(51) Int. Cl.
*F15B 11/16* (2006.01)
*B66F 11/04* (2006.01)
(Continued)

(52) U.S. Cl.
CPC .......... *F15B 11/165* (2013.01); *B66F 11/044* (2013.01); *B66F 17/006* (2013.01);
(Continued)

(58) Field of Classification Search
CPC ....... F15B 11/055; F15B 11/16; F15B 11/165; F15B 2211/7741; B66F 11/044; B66F 17/006
See application file for complete search history.

(56) References Cited

U.S. PATENT DOCUMENTS 10,617,059 B2 * 4/2020 Dunn ...................... F15B 1/021
11,009,048 B1 * 5/2021 Neumann ............. E02F 9/2292
(Continued)

FOREIGN PATENT DOCUMENTS

CN 203570716 U 4/2014
CN 111255007 A 6/2020
(Continued)

OTHER PUBLICATIONS

International Search Report and Written Opinion of PCT/CN2022/143606 dated Aug. 4, 2023, 12 pages (English and Chinese).

*Primary Examiner* — Michael Leslie
(74) *Attorney, Agent, or Firm* — Dicke, Billig & Czaja, PLLC

(57) ABSTRACT

A floating control system for a fixed displacement pump system is disclosed, which relates to the technical field of floating mechanisms and includes: a fixed displacement pump, floating control valves, a floating mechanism, boom function valves, an actuator and a control device, where the fixed displacement pump, the floating control valves and the floating mechanism are connected in sequence, the fixed displacement pump, the boom function valves and the actuator are connected in sequence, the floating control valves include a pressure reducing valve and a floating
(Continued)

switching valve, and the boom function valves include a fixed differential overflow valve and a proportional directional valve; and the fixed differential overflow valve and the proportional directional valve are connected in parallel between the fixed displacement pump and an oil return tank, the floating switching valve and the fixed differential overflow valve are connected through a feedback oil path.

9 Claims, 1 Drawing Sheet

(51) Int. Cl.

| | |
|---|---|
| ***B66F 17/00*** | (2006.01) |
| ***F15B 11/05*** | (2006.01) |
| ***F15B 19/00*** | (2006.01) |

(52) U.S. Cl.

CPC .......... *F15B 11/055* (2013.01); *F15B 19/005* (2013.01); *F15B 2211/20515* (2013.01); *F15B 2211/20538* (2013.01); *F15B 2211/3127* (2013.01); *F15B 2211/50518* (2013.01); *F15B 2211/6052* (2013.01); *F15B 2211/87* (2013.01); *F15B 2211/8755* (2013.01)

(56) References Cited

U.S. PATENT DOCUMENTS

| | | | | | |
|---|---|---|---|---|---|
| 12,312,219 | B2 * | 5/2025 | Zou | ......................... | F15B 13/02 |
| 12,338,109 | B2 * | 6/2025 | Liu | ....................... | F15B 11/055 |
| 2015/0300380 | A1 | 10/2015 | Ueda et al. | | |
| 2023/0349397 | A1 * | 11/2023 | Fasano | .................. | F15B 13/026 |
| 2024/0200579 | A1 * | 6/2024 | Desseux | ............... | B66F 11/044 |

FOREIGN PATENT DOCUMENTS

| | | | | | |
|---|---|---|---|---|---|
| CN | 111749937 | A | | 10/2020 | |
| CN | 111943099 | A | | 11/2020 | |
| CN | 112128153 | A | | 12/2020 | |
| CN | 112324728 | A | | 2/2021 | |
| CN | 113847291 | A | | 12/2021 | |
| CN | 218817296 | U | | 4/2023 | |
| CN | 118047334 | A | * | 5/2024 | .............. F15B 13/01 |
| CN | 118836192 | A | * | 10/2024 | .............. B66F 11/00 |
| JP | 6221302 | A | | 8/1994 | |

* cited by examiner

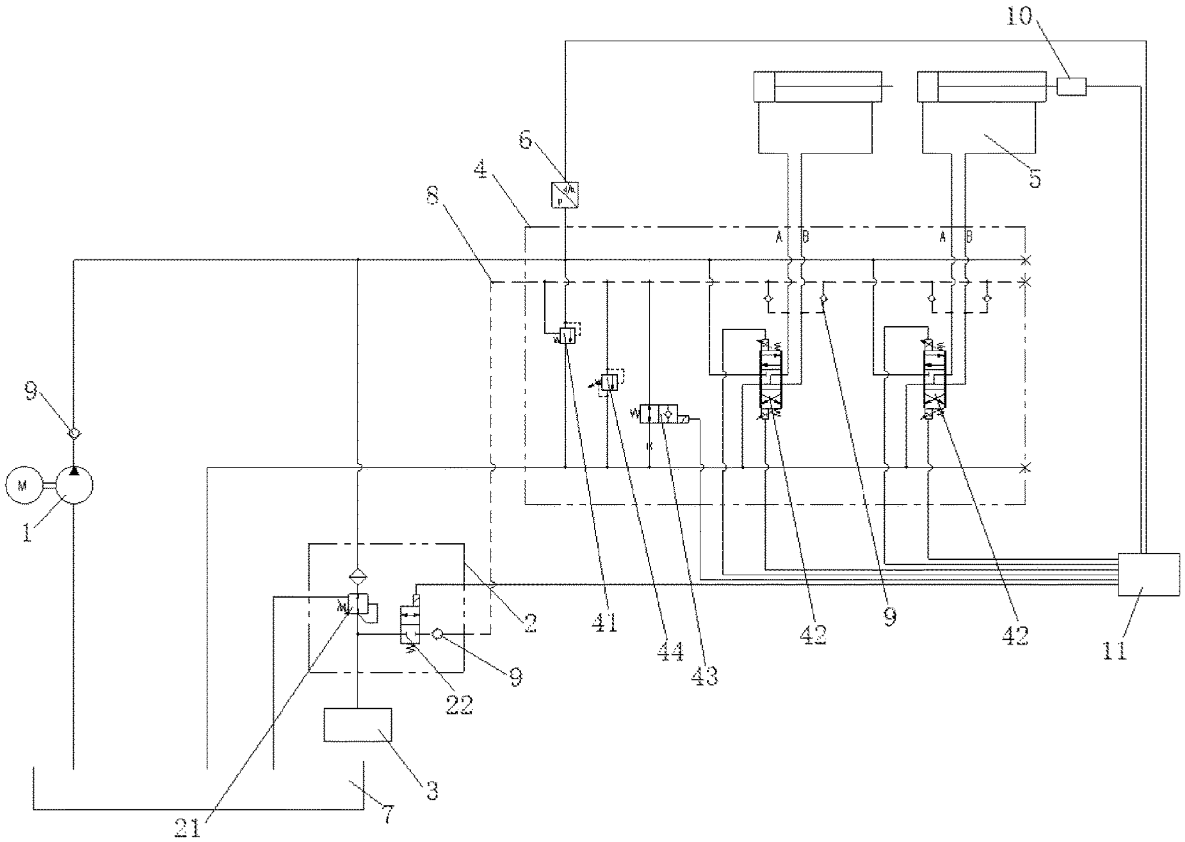
10
6
4
8
5
A
B
A
B
9
M
1
2
41
44
43
42
9
42
11
9
22
3
21
7

FLOATING CONTROL SYSTEM FOR FIXED DISPLACEMENT PUMP SYSTEM

CROSS-REFERENCE TO RELATED APPLICATIONS

This application is a national stage filing under 35 U.S.C. § 371 of international application number PCT/CN2022/143606, filed Dec. 29, 2022, which claims priority to Chinese patent application No. 202211653209.9 filed Dec. 19, 2022. The contents of these applications are incorporated herein by reference in their entirety.

TECHNICAL FIELD

The present disclosure relates to the technical field of floating mechanisms, in particular to a floating control system for a fixed displacement pump system.

BACKGROUND

In the existing technology, aerial work platforms generally feature a floating function to improve the off-road performance and operation comfort of the chassis. During walking, a hydraulic system is employed to provide a constant pressure for a floating mechanism, so as to ensure timely response. In addition, it is necessary to ensure that the output of the steering action is not affected when the floating mechanism is activated.

To meet the control requirements of the aerial work platforms, some aerial work platforms utilize a system with a fixed displacement pump. This system typically employs an electro-proportional overflow valve, which is kept in a relatively low-pressure standby state when given a signal during system operation. Moreover, when a constant pressure standby state is required for floating, the pressure of the electro-proportional overflow valve is adjusted by modifying a current signal, thereby maintaining the desired pressure for floating. In order to enable steering during walking, the pressure value needs to take into account the steering pressure as well. However, due to the high cost of the electro-proportional overflow valve itself and its demanding control requirements, it is challenging to find a suitable control solution.

To sum up, how to provide a constant pressure to the floating mechanism without affecting the output of steering actions is an urgent problem to be solved by those of ordinary skills in the art.

SUMMARY

In view of this, an objective of the present disclosure is to provide a floating control system for a fixed displacement pump system, which can provide a constant pressure to a floating mechanism without affecting the steering action output of an actuator.

In order to achieve the above objective, the present disclosure provides the following technical scheme.

A floating control system for a fixed displacement pump system includes: a fixed displacement pump, floating control valves, a floating mechanism, boom function valves, an actuator and a control device, where the fixed displacement pump, the floating control valves and the floating mechanism are connected in sequence, the fixed displacement pump, the boom function valves and the actuator are connected in sequence, the floating control valves include a pressure reducing valve and a floating switching valve, and the boom function valves include a fixed differential overflow valve and a proportional directional valve for controlling a direction change of the actuator;

the fixed differential overflow valve and the proportional directional valve are connected in parallel between the fixed displacement pump and an oil return tank, the floating switching valve and the fixed differential overflow valve are connected through a feedback oil path, and a one-way valve is arranged between the floating switching valve and the fixed differential overflow valve; and the actuator is connected to the feedback oil path through the proportional directional valve, and a motor for driving the fixed displacement pump to rotate, solenoid valves for controlling actions in the floating control valves and solenoid valves for controlling actions in the boom function valves are all connected to the control device.

Optionally, a pressure sensor for detecting system pressure is arranged at an outlet of the fixed displacement pump, the pressure sensor is connected to the control device, and the control device is used for recognizing a system fault when there is no output from both the floating control valves and the boom function valves, but a pressure at the outlet of the fixed displacement pump is detected to be higher than a predetermined range of standby pressure, so as to control the fixed displacement pump to stop operating.

Optionally, the boom function valves further include an unloading valve, one end of the unloading valve is arranged on the feedback oil path, and the other end of the unloading valve is connected to the oil return tank.

Optionally, the boom function valves further include a main overflow valve, one end of the main overflow valve is arranged on the feedback oil path, and the other end of the main overflow valve is connected to the oil return tank.

Optionally, an output end of the fixed displacement pump is provided with a one-way valve.

Optionally, the number of the actuator and the number of the proportional directional valve are both greater than or equal to one, and the actuator is connected to the proportional directional valve in one-to-one correspondence.

Optionally, an input end and an output end of the actuator are connected to the feedback oil path through the one-way valve.

Optionally, the actuator is provided with a detection sensor for monitoring operations of the actuator, the detection sensor is connected to the control device, and the control device is used for recognizing a fault in the boom function valves when the detection sensor detects that the actuator has an action output but does not output a control signal to the control valve, so as to control the system to stop running.

Optionally, the actuator is a steering oil cylinder.

According to the floating control system for the fixed displacement pump system provided by the present disclosure, when the fixed displacement pump starts to run, a certain amount of oil will be output to the system. Because the system adopts the fixed differential overflow valve, when no load is fed back to a feedback port of the fixed differential overflow valve, an opening pressure of the fixed differential overflow valve is a spring set pressure, and at this time, oil flowing out of the fixed displacement pump overflows through the fixed differential overflow valve, and an overflow pressure is the same as a spring force of the fixed differential overflow valve, so the system is in a low-pressure standby state.

When an output of the actuator is required, the proportional directional valve performs direction change, and at this time, a load pressure is fed back to the feedback port of the fixed differential overflow valve. Under the simultaneous action of pressure on two sides and the spring force, a valve port of the fixed differential overflow valve is reduced, and the pressure at the outlet of the fixed displacement pump is increased, such that more oil can enter the actuator through the proportional directional valve. At the same time, due to the characteristics of the fixed differential overflow valve, the pressure differential of the proportional directional valve remains consistent, that is, a flow rate of the proportional directional valve does not vary with changes in load. Further, the load-sensitive control of the fixed displacement pump system can be realized. After the action is completed, the proportional directional valve slowly moves to a middle position, the feedback oil path is unloaded, oil at the outlet of the fixed displacement pump overflows at low pressure again through the fixed differential overflow valve, and the system returns to the low-pressure standby state.

When an aerial work platform walks, a stable standby pressure needs to be provided to the floating mechanism. At this time, the floating switching valve is reversed and connected, a pressure at a rear end of the pressure reducing valve is fed back to the feedback port of the fixed differential overflow valve through the floating switching valve, and the valve port of the fixed differential overflow valve is reduced under the action of the pressure at two ends and the spring force. At this time, because all working valve ports are in a closed state, the pressure at the outlet of the fixed displacement pump is increased due to the reduction of the valve port and overflow volume after oil accumulation. When the pressure rises to a set pressure of the pressure reducing valve, the pressure at the rear end of the pressure reducing valve will no longer rise, that is, a feedback pressure of the feedback oil path will no longer rise. At this time, due to the spring force, the valve port of the fixed differential overflow valve will continue to reduce until the pressure at the outlet of the fixed displacement pump is maintained at the sum of a feedback pressure at the rear end of the pressure reducing valve and the spring set pressure of the fixed differential overflow valve. Then, the valve port of the fixed differential overflow valve remains unchanged, and the system stays balanced. The reduction in overflow oil caused by the reduction in the valve port of the fixed differential overflow valve can be used to maintain internal leakage of the system, and the pressure at the outlet of the fixed displacement pump remains unchanged at this time, thus achieving the provision of a stable standby pressure to the floating mechanism.

In this system, a load-sensitive system of the fixed displacement pump is formed by the fixed differential overflow valve to realize a low-pressure standby state, and at the same time, a stable constant standby pressure is provided to the floating mechanism through the floating control valves and the feedback oil path. In addition, because the one-way valve is provided between the floating switching valve and the fixed differential overflow valve, oil only flows from the floating switching valve to the fixed differential overflow valve, effectively avoiding the backflow phenomenon in the feedback oil path. Therefore, the functioning of the floating mechanism does not affect the steering output of the actuator, ensuring that they work independently and enabling the system to maintain a floating constant pressure standby mode without interfering with the steering action output of the actuator.

To sum up, the floating control system for the fixed displacement pump system provided by the present disclosure can provide a constant pressure to the floating mechanism without affecting the steering action output of the actuator.

BRIEF DESCRIPTION OF DRAWINGS

In order to explain the embodiments of the present disclosure or the technical scheme more clearly in the existing technology, the drawings needed in the description of the embodiments or the existing technology will be briefly introduced below. Obviously, the drawings in the following description are only embodiments of the present disclosure. For those of ordinary skill in the art, other drawings can be obtained according to the provided accompanying drawings without paying creative labor.

FIG. 1 is a schematic diagram of component connection of a floating control system for a fixed displacement pump system provided by the present disclosure.

In FIG. 1:

1 is a fixed displacement pump, 2 is a floating control valve, 21 is a pressure reducing valve, 22 is a floating switching valve, 3 is a floating mechanism, 4 is a boom function valve, 41 is a fixed differential overflow valve, 42 is a proportional directional valve, 43 is an unloading valve, 44 is a main overflow valve, 5 is an actuator, 6 is a pressure sensor, 7 is an oil return tank, 8 is a feedback oil path, 9 is a one-way valve, 10 is a detection sensor and 11 is a control device.

DETAILED DESCRIPTION

The technical schemes in the embodiments of the present disclosure are clearly and completely described in the following with reference to the drawings in the embodiments of the present disclosure. It is obvious that the described embodiments are only some of the embodiments of the present disclosure and are not all the embodiments thereof. All other embodiments obtained by those of ordinary skill in the art based on the embodiments of the present disclosure without inventive effort are within the scope of the present disclosure.

The core of the present disclosure is to provide a floating control system for a fixed displacement pump system, which can provide a constant pressure to a floating mechanism without affecting the steering action output of an actuator.

Please refer to FIG. 1 which is a schematic diagram of component connection of a floating control system for a fixed displacement pump system provided by the present disclosure.

This particular embodiment provides a floating control system for a fixed displacement pump system, including: a fixed displacement pump 1, floating control valves 2, a floating mechanism 3, boom function valves 4, an actuator 5 and a control device 11. The fixed displacement pump 1, the floating control valves 2 and the floating mechanism 3 are connected in sequence, the fixed displacement pump 1, the boom function valves 4 and the actuator 5 are connected in sequence. The floating control valves 2 include a pressure reducing valve 21 and a floating switching valve 22, and the boom function valves 4 include a fixed differential overflow valve 41 and a proportional directional valve 42 for controlling a direction change of the actuator 5. The fixed differential overflow valve 41 and the proportional directional valve 42 are connected in parallel between the fixed displacement pump 1 and an oil return tank 7, the floating switching valve 22 and the fixed differential overflow valve 41 are connected through a feedback oil path 8, and a one-way valve 9 is arranged between the floating switching valve 22 and the fixed differential overflow valve 41. The actuator 5 is connected to the feedback oil path 8 through the proportional directional valve 42, and a motor for driving the fixed displacement pump 1 to rotate, solenoid valves for controlling actions in the floating control valves 2 and solenoid valves for controlling actions in the boom function valves 4 are all connected to the control device 11.

It should be noted that the characteristics of the fixed differential overflow valve 41 can keep the pressure differential of the proportional directional valve 42 consistent, which means that during the transition of the proportional directional valve 42 from fully closed to open, a pressure at a front end of the proportional directional valve 42 is equal to a pressure at an inlet of the fixed differential overflow valve 41, and a pressure at a rear end of the proportional directional valve 42 is fed back to a spring side of the fixed differential overflow valve 41 through the one-way valve 9. Since the characteristic of the fixed differential overflow valve 41 is that the inlet pressure is equal to a pressure at a feedback port plus a spring force, a pressure differential between the front and rear ends of the proportional directional valve 42, which is the inlet pressure minus the outlet pressure, also equivalent to the spring force of the fixed differential overflow valve 41, remains constant under the action of the fixed differential overflow valve 41.

The shapes, structures, types and positions of the fixed displacement pump 1, the floating control valves 2, the floating mechanism 3, the boom function valves 4, the actuator 5 and the control device 11 can be determined according to the actual situation and actual needs.

When using the floating control system for the fixed displacement pump system provided by the present disclosure, when the fixed displacement pump 1 starts to run, a certain amount of oil will be output to the system. Because the system adopts the fixed differential overflow valve 41, when no load is fed back to a feedback port of the fixed differential overflow valve 41, an opening pressure of the fixed differential overflow valve 41 is a spring set pressure, and at this time, oil flowing out of the fixed displacement pump 1 overflows through the fixed differential overflow valve 41, and an overflow pressure is the same as the spring force of the fixed differential overflow valve 41, so the system is in a low-pressure standby state.

When an output of the actuator 5 is required, the proportional directional valve 42 performs direction change, and at this time, a load pressure is fed back to the feedback port of the fixed differential overflow valve 41. Under the simultaneous action of pressure on two sides and the spring force, a valve port of the fixed differential overflow valve 41 is reduced, and the pressure at the outlet of the fixed displacement pump 1 is increased, such that more oil can enter the actuator 5 through the proportional directional valve 42. At the same time, due to the characteristics of the fixed differential overflow valve 41, the pressure differential of the proportional directional valve 42 remains consistent, that is, a flow rate of the proportional directional valve 42 does not vary with changes in load. Further, the load-sensitive control of the fixed displacement pump 1 system can be realized. After the action is completed, the proportional directional valve 42 slowly moves to a middle position, the feedback oil path 8 is unloaded, oil at the outlet of the fixed displacement pump 1 overflows at low pressure again through the fixed differential overflow valve 41, and the system returns to the low-pressure standby state.

When an aerial work platform walks, a stable standby pressure needs to be provided to the floating mechanism 3. At this time, the floating switching valve 22 is reversed and connected, a pressure at a rear end of the pressure reducing valve 21 is fed back to the feedback port of the fixed differential overflow valve 41 through the floating switching valve 22, and the valve port of the fixed differential overflow valve 41 is reduced under the action of the pressure at two ends and the spring force. At this time, because all working valve ports are in a closed state, the pressure at the outlet of the fixed displacement pump 1 is increased due to the reduction of the valve port and overflow volume after oil accumulation. When the pressure rises to a set pressure of the pressure reducing valve 21, the pressure at the rear end of the pressure reducing valve 21 will no longer rise, that is, a feedback pressure of the feedback oil path 8 will no longer rise. At this time, due to the spring force, the valve port of the fixed differential overflow valve 41 will continue to reduce until the pressure at the outlet of the fixed displacement pump 1 is maintained at the sum of a feedback pressure at the rear end of the pressure reducing valve 21 and the spring set pressure of the fixed differential overflow valve 41. Then, the valve port of the fixed differential overflow valve 41 remains unchanged, and the system stays balanced. The reduction in overflow oil caused by the reduction in the valve port of the fixed differential overflow valve 41 can be used to maintain internal leakage of the system, and the pressure at the outlet of the fixed displacement pump 1 remains unchanged at this time, thus achieving the provision of a stable standby pressure to the floating mechanism 3.

In this system, a load-sensitive system of the fixed displacement pump 1 is formed by the fixed differential overflow valve 41 to realize a low-pressure standby state, and at the same time, a stable constant standby pressure is provided to the floating mechanism 3 through the floating control valves 2 and the feedback oil path 8. In addition, because the one-way valve 9 is provided between the floating switching valve 22 and the fixed differential overflow valve 41, oil only flows from the floating switching valve 22 to the fixed differential overflow valve 41, effectively avoiding the backflow phenomenon in the feedback oil path 8. Therefore, the functioning of the floating mechanism 3 does not affect the steering output of the actuator 5, ensuring that they work independently and enabling the system to maintain a floating constant pressure standby mode without interfering with the steering action output of the actuator 5.

To sum up, the floating control system for the fixed displacement pump system provided by the present disclosure can provide a constant pressure to the floating mechanism 3 without affecting the steering action output of the actuator 5.

On the basis of the above embodiment, optionally, a pressure sensor 6 for detecting system pressure is arranged at an outlet of the fixed displacement pump 1, the pressure sensor 6 is connected to the control device 11, and the control device 11 is used for recognizing a system fault when there is no output from both the floating control valves 2 and the boom function valves 4, but a pressure at the outlet of the fixed displacement pump 1 is detected to be higher than a predetermined range of standby pressure, so as to control the fixed displacement pump 1 to stop operating.

It should be noted that hydraulic oil is divided into two paths after coming out of the fixed displacement pump 1, one path to the floating control valves 2 and the other path to the boom function valves 4, so the pressure sensor 6 can detect not only the pressure at the front end of the pressure reducing valve 21, but also the pressure at an inlet of the boom function valve 4. Therefore, when there is no output from the solenoid valves on the floating control valves 2 and the boom function valves 4, if the pressure sensor 6 detects that the outlet pressure of the fixed displacement pump 1 is higher than the predetermined range of standby pressure, the control device 11 will recognize a system fault, and then control the motor for driving the fixed displacement pump 1 to stop rotating, so as to ensure prompt shutdown in the event of hydraulic system faults and provide effective component protection.

In addition, it should be noted that a gear pump, as one type of fixed displacement pump 1, has become the main choice of power source for a hydraulic system of the aerial work platform because of its simple structure and strong pollution resistance. In the fixed displacement pump 1 system mainly adopting a gear pump, a load-sensitive system of the fixed displacement pump 1 is formed by the fixed differential overflow valve 41 to realize a low-pressure standby state, and at the same time, a stable constant standby pressure is provided to the floating mechanism 3 through a floating control circuit. Further, the normal output of steering actions is not affected in the floating constant pressure standby state.

It should also be noted that as the power source for the hydraulic system, the gear pump outputs a certain amount of oil to the system when the motor starts to rotate. Because the system adopts the fixed differential overflow valve 41, when no load is fed back to a feedback port of the fixed differential overflow valve 41, an opening pressure of the fixed differential overflow valve 41 is a spring set pressure, which is generally 15-20 bar. At this time, oil at the outlet end of the gear pump will overflow through the fixed differential overflow valve 41, and an overflow pressure is the same as the spring force of the fixed differential overflow valve 41, so the system is in a low-pressure standby state.

Optionally, the boom function valves 4 further include an unloading valve 43, one end of the unloading valve 43 is arranged on the feedback oil path 8, and the other end of the unloading valve is connected to the oil return tank 7.

It should be noted that when an output of the actuator 5 is required, the unloading valve 43 can be switched to a right position, and the proportional directional valve 42 will be switched to a right position. At this time, a load pressure is fed back to the feedback port of the fixed differential overflow valve 41, and a valve port of the fixed differential overflow valve 41 is reduced under the simultaneous action of pressure on two sides and the spring force, such that more oil enters the actuator 5 through the proportional directional valve 42. At the same time, due to the characteristics of the fixed differential overflow valve 41, the pressure differential of the proportional directional valve 42 remains consistent, that is, a flow rate of oil passing through the proportional directional valve 42 does not vary with changes in load. Further, the load-sensitive control of the fixed displacement pump 1 system can be realized. After the action of the actuator 5 is completed, the proportional directional valve 42 slowly returns to a middle position, then the unloading valve 43 is switched to a left position, the feedback oil path 8 is unloaded, oil at the outlet of the fixed displacement pump 1 overflows at low pressure again through the fixed differential overflow valve 41, and the system returns to the low-pressure standby state.

When the aerial work platform walks, a stable standby pressure needs to be provided to the floating mechanism 3. At this time, the unloading valve 43 is switched to the right position, and the floating switching valve 22 is reversed and connected. The pressure at the rear end of the pressure reducing valve 21 is fed back to the feedback port of the fixed differential overflow valve 41 through the floating switching valve 22 and the one-way valve 9, and the valve port of the fixed differential overflow valve 41 is reduced under the action of pressure at two ends and the spring force. At this time, because all working valve ports are in a closed state, the pressure at the outlet of the fixed displacement pump 1 is increased due to oil accumulation. When the pressure rises to a set pressure of the pressure reducing valve 21, the pressure at the rear end of the pressure reducing valve 21 will no longer rise, that is, a feedback pressure will no longer rise. At this time, due to the spring force, the valve port of the fixed differential overflow valve 41 will continue to reduce until the pressure at the outlet of the fixed displacement pump 1 is maintained at the sum of a feedback pressure at the rear end of the pressure reducing valve 21 and the spring set pressure of the fixed differential overflow valve 41. Then, the valve port of the fixed differential overflow valve 41 remains unchanged, and the system stays balanced. In addition, the reduction in overflow oil caused by the reduction in the valve port of the fixed differential overflow valve 41 can be used to balance the oil leakage in the system, and the pressure at the outlet of the fixed displacement pump 1 remains unchanged at this time, thus achieving the provision of a stable standby pressure to the floating mechanism 3.

On the basis of the above embodiment, optionally, the boom function valves 4 further include a main overflow valve 44, one end of the main overflow valve 44 is arranged on the feedback oil path 8, and the other end of the main overflow valve 44 is connected to the oil return tank 7.

Optionally, an output end of the fixed displacement pump 1 is provided with a one-way valve 9 to effectively limit the oil flow direction and prevent oil from flowing back to the fixed displacement pump 1.

Optionally, the number of the actuator 5 and the number of the proportional directional valve 42 are both greater than or equal to one, and the actuator 5 is connected to the proportional directional valve 42 in one-to-one correspondence.

Optionally, an input end (port A) and an output end (port B) of the actuator 5 are connected to the feedback oil path 8 through the one-way valve 9.

It should be noted that oil flows out from the outlet of the fixed displacement pump 1, passes through the one-way valve 9, and then reaches the floating control valves 2 and the boom function valves 4. Oil enters the floating mechanism 3 through the pressure reducing valve 21, and a floating control oil path downstream of the pressure reducing valve 21 is fed back to the boom function valves 4 through the floating switching valve 22 and the one-way valve 9. A main oil path inside the boom function valves 4 is connected to the fixed differential overflow valve 41 and two proportional directional valves 42 (three-position four-way directional valves). After the proportional directional valve 42 performs direction change, oil will enter the input end or output end, and then enter the actuator 5. In addition, the feedback oil path 8 of the boom function valves 4 is connected to the feedback port of the fixed differential overflow valve 41 and an inlet of the unloading valve 43, and an input end and an output end of the actuator 5 are connected to the feedback oil path 8 through the one-way valve 9.

When the floating switching valve 22 performs switching, the pressure at the rear end of the pressure reducing valve 21 is fed back to the feedback oil path 8 through the one-way valve 9, and then reaches the feedback port of the fixed differential overflow valve 41, so as to reduce the valve port of the fixed differential overflow valve 41 and increase the pressure at the outlet of the fixed displacement pump 1. If a steering action occurs at this time, a steering pressure is smaller than a pressure fed back after the floating switching valve 22, the load pressure for steering cannot open the one-way valve 9 at the actuator 5 and be fed back to the feedback oil path 8. Only when the steering pressure is higher than the pressure fed back after the floating switching valve 22, the steering pressure can open the one-way valve 9 at the actuator 5 and reach the feedback oil path 8. At this time, due to the load pressure for steering in the feedback oil path 8 being greater than the pressure at the floating switching valve 22, the one-way valve 9 at the floating switching valve 22 will close again. Only the maximum load can exist in the feedback oil path 8, and only the maximum load can be fed back to the feedback oil path 8 to adjust the opening degree of the fixed differential overflow valve 41.

On the basis of the above embodiment, optionally, the actuator 5 is provided with a detection sensor 10 for monitoring operations of the actuator 5, the detection sensor 10 is connected to the control device 11, and the control device 11 is used for recognizing a fault of the boom function valve 4 when the detection sensor 10 detects that the actuator 5 has an action output but does not output a control signal to a control valve of the actuator 5, so as to control the system to stop running. At this time, the unloading valve 43 on the boom function valves 4 can be controlled to be electrified, and the feedback oil path 8 can be cut off to stop the action of the actuator 5. It is also possible to control the motor for driving the fixed displacement pump 1 to stop running, so as to stop the flow output of the fixed displacement pump 1, thereby stopping the operation of the fixed displacement pump 1.

It should be noted that in this system, the detection sensor 10 can monitor control valve faults of each actuator 5 in real time in combination with some electrical components, enabling fault detection and alarm generation. In the event of a fault, the action of the actuator 5 can be stopped in time, thus providing safety assurance for the whole aerial work platform.

It should be added that when the system is only in a floating output state with no output required from other actuators 5, a system pressure detected by the pressure sensor 6 should be the sum of a spring set value of the fixed differential overflow valve 41 and a set value of the pressure reducing valve 21. However, if a pressure value detected by the pressure sensor 6 is greater than this value at this time, it indicates a system fault. At this time, the control device 11 can send a signal to the unloading valve 43 to cease its current output, such that the feedback oil path 8 is unloaded, and a pressure differential at the outlet of the fixed displacement pump 1 cannot be established. This helps the system identify it as a valve group fault and issue an alarm signal, thereby ensuring safety testing and fault interruption.

Optionally, the actuator 5 is a steering oil cylinder.

It should be noted that the actuator 5 is a steering oil cylinder, which requires steering action alongside the walking motion. The proportional directional valve 42 used for controlling a direction change of the actuator 5 needs to switch direction accordingly. Oil from the outlet of the fixed displacement pump 1 is supplied to the actuator 5. As the amount of oil increases, a load pressure at the actuator 5 gradually rises. When the load pressure at the actuator 5 exceeds the set pressure of the pressure reducing valve 21, the load pressure at the actuator 5 begins to play a primary role. Under the action of the spring force, the valve port of the fixed differential overflow valve 41 further reduces to increase the pressure at the front end of the proportional directional valve 42, which is maintained at a level greater than a set value of the spring force. Since the feedback oil path 8 behind the pressure reducing valve 21 is provided with the one-way valve 9, the output of the actuator 5 will not be affected when the system is in a constant pressure standby state.

This system selects a gear pump as the system oil source, and the floating constant pressure standby state is realized by feeding back the pressure at the rear end of the pressure reducing valve 21 to the fixed differential overflow valve 41. Compared with other methods, this method is simpler, easier to realize and more energy-saving, and can reduce the noise and heat generation of the system. Because the feedback oil path 8 of the pressure reducing valve 21 is provided with the one-way valve 9, other load-sensitive operations are unaffected while in a constant pressure standby state, contributing to greater energy efficiency. Through the cooperation between electrical components and an electrical system, plus the unloading valve 43 of the feedback oil path 8, the safety of the aerial work platform can be effectively prevented from being affected by valve group faults and other reasons, and the safety of the system is relatively high.

A load-sensitive circuit of the fixed displacement pump 1 system is formed by the fixed differential overflow valve 41, the floating constant pressure standby state is realized by the feedback oil path 8 of the pressure reducing valve 21, and other actuators 5 are unaffected in the floating constant pressure standby state. Through cooperation between the electrical components and unloading valve 43 and the electrical system, it is possible to monitor the control valve faults of each actuator 5 in a floating constant pressure state, and to switch in time when faults occur, thus improving the safety and reliability of the system.

It should also be noted that in the description of this application, the orientation or position relationship indicated by the terms like "in" and "out" are based on the orientation or position relationship shown in the drawings, only for convenience of simplifying description and understanding, and do not indicate or imply that the indicated device or element must have a specific orientation, or be constructed and operate in a specific orientation, and therefore cannot be understood as a limitation of the present disclosure.

All the embodiments in this specification are described in a progressive way, and each embodiment focuses on the differences from other embodiments. The common and similar aspects between the embodiments can be cross-referenced with each other. Any combination of all the embodiments provided by the present disclosure is within the protection scope of the present disclosure, and will not be repeated here.

The floating control system for the fixed displacement pump system provided by the present disclosure has been described in detail above. Specific examples are used to explain the principle and implementation of the present disclosure, and the description of the above embodiments is only used to help understand the method and core idea of the present disclosure. It should be pointed out that for those of ordinary skills in the art, without departing from the principle of the present disclosure, several improvements and modifications can be made to the present disclosure, and these improvements and modifications also fall within the scope of protection of the claims of the present disclosure.

What is claimed is:

1. A floating control system for a fixed displacement pump system, comprising: a fixed displacement pump, floating control valves, a floating mechanism, boom function valves, an actuator and a control device, wherein the fixed displacement pump, the floating control valves and the floating mechanism are connected in sequence, the fixed displacement pump, the boom function valves and the actuator are connected in sequence, the floating control valves comprise a pressure reducing valve and a floating switching valve, and the boom function valves comprise a fixed differential overflow valve and a proportional directional valve for controlling a direction change of the actuator;

the fixed differential overflow valve and the proportional directional valve are connected in parallel between the fixed displacement pump and an oil return tank, the floating switching valve and the fixed differential overflow valve are connected through a feedback oil path, and a one-way valve is arranged between the floating switching valve and the fixed differential overflow valve; and the actuator is connected to the feedback oil path through the proportional directional valve, and a motor for driving the fixed displacement pump to rotate, solenoid valves for controlling actions in the floating control valves and solenoid valves for controlling actions in the boom function valves are all connected to the control device.

2. The floating control system for a fixed displacement pump system of claim 1, wherein a pressure sensor for detecting system pressure is arranged at an outlet of the fixed displacement pump, the pressure sensor is connected to the control device, and the control device is used for recognizing a system fault when there is no output from both the floating control valves and the boom function valves, but a pressure at the outlet of the fixed displacement pump is detected to be higher than a predetermined range of standby pressure, so as to control the fixed displacement pump to stop operating.

3. The floating control system for a fixed displacement pump system of claim 1, wherein the boom function valves further comprise an unloading valve, one end of the unloading valve is arranged on the feedback oil path, and the other end of the unloading valve is connected to the oil return tank.

4. The floating control system for a fixed displacement pump system of claim 3, wherein the boom function valves further comprise a main overflow valve, one end of the main overflow valve is arranged on the feedback oil path, and the other end of the main overflow valve is connected to the oil return tank.

5. The floating control system for a fixed displacement pump system of claim 1, wherein an output end of the fixed displacement pump is provided with a one-way valve.

6. The floating control system for a fixed displacement pump system of claim 1, wherein the number of the actuator and the number of the proportional directional valve are both greater than or equal to one, and the actuator is connected to the proportional directional valve in one-to-one correspondence.

7. The floating control system for a fixed displacement pump system of claim 6, wherein an input end and an output end of the actuator are connected to the feedback oil path through a one-way valve.

8. The floating control system for a fixed displacement pump system of claim 1, wherein the actuator is provided with a detection sensor for monitoring operations of the actuator, the detection sensor is connected to the control device, and the control device is used for recognizing a fault in the boom function valves when the detection sensor detects that the actuator has an action output but does not output a control signal to the control valve, so as to control the system to stop running.

9. The floating control system for a fixed displacement pump system of claim 1, wherein the actuator is a steering oil cylinder.

* * * * *